United States Patent Office 3,358,044
Patented Dec. 12, 1967

3,358,044
METHOD FOR PREPARING PHENOL-TYPE COMPOUNDS EMPLOYING AN IMPROVED CATALYST
Joseph L. Russell, Ridgewood, N.J., and Alvin D. Silber, Riverdale, N.Y., assignors to Halcon International, Inc., a corporation of Delaware
No Drawing. Continuation of application Ser. No. 133,774, Aug. 25, 1961. This application Sept. 14, 1964, Ser. No. 396,350
1 Claim. (Cl. 260—621)

This application is a continuation of U.S. patent application, Ser. No. 133,774, filed Aug. 25, 1961, now abandoned.

This invention relates to a process for preparing phenol by the catalytic dehydrogenation of an oxygenated cyclohexane material in the presence of platinum-on-carbon catalyst, more particularly to such a process and catalyst prepared by depositing platinum on carbon from a solution of a platinum compound by mixing and boiling the carbon therein for a period of approximately 16 hours, whereby a catalyst having improved selectivity for forming phenol and also improved active life is obtained. The invention also relates to the catalyst so obtained.

Phenol, a very important industrial chemical, may be prepared by catalytically dehydrogenating cyclohexanone or cyclohexanol. However, difficulties are encountered in maintaining catalyst life. In addition, more selective catalysts are desired for obtaining phenol by this dehydrogenation reaction. The art is confronted by the problem of providing an improved catalyst for preparing phenol from cyclohexanol or cyclohexanone as well as improved processes for producing phenol by the catalytic dehydrogenation of an oxygenated cyclohexane material.

The discoveries associated with the invention relating to solution of the above problems and the objects achieved in accordance with the invention as described herein include the provision of:

a process for preparing a phenol from a crude oxygenated cyclohexane fraction containing cyclohexanone or cyclohexanol or both or lower alkyl ring substituted derivatives thereof, by vaporizing this fraction and diluting with hydrogen in an amount in the range of 0.02 to 0.30 gram of hydrogen per gram of total cyclohexanone and cyclohexanol therein and contacting the resulting mixture with a dehydrogenation catalyst at a temperature in the range of 250° to 425° C. at a liquid hourly space velocity in the range of 0.3 to 2.5 and recovering the phenol from the reaction product, including the improvement of using as a catalyst platinum-on-active-carbon containing up to 5% by weight of platinum which platinum has been deposited on the carbon by contacting the latter with a solution of a platinum compound in a solvent under platinum depositing conditions and continuing the contacting for a substantial time in excess of that required for essentially complete absorption of the platinum by the carbon;

Such a process wherein the solvent used in preparing the catalyst is water;

Such a process wherein the boiling step for preparing a catalyst is for a time of about 16 hours;

A process for preparing a catalyst useful for preparing phenol by the dehydrogenation of a cyclohexanol containing material by depositing platinum on active carbon in catalytic quantities up to 5% by weight of the catalyst, this deposition being by contacting the carbon with a solution of a platinum compound in solvent under platinum depositing conditions and continuing the contacting for a substantial time in excess of that required for essentially complete absorption of the platinum by the carbon;

Such a process wherein the solvent is water;

Such a process wherein the boiling time is about 16 hours and the catalyst contains about 2% platinum;

A catalyst obtained by such a process;

And other objects which will be apparent as details or embodiments of the invention are set forth herein after.

In order to indicate still more fully the nature of the present invention, the following examples of typical procedures are set forth, in which parts and percent means parts and percent by weight, respectively, unless otherwise indicated, it being understood that these examples are presented as illustrative only and are not intended to limit the scope of the invention.

EXAMPLE 1

A catalyst is prepared by first refluxing the activated carbon support (6–14 mesh, coconut carbon), in 0.5 N HCl, and then washing the particles free of acid (to a pH of 5.3) with distilled water. The 2% Pt catalyst is then prepared by finely distributing the platinum over the carbon surface. This is accomplished by refluxing the support particles overnight (16 hours) in a water solution of ammonium chloro platinate (in appropriate amount). The catalyst is then filtered from the solution, washed with distilled water and dried in an oven overnight (16 hours) at 110° C. Quantitative tests for platinum indicate that over 99.9% of the platinum in solution is absorbed by the activated carbon in the preparation of the catalyst. A 2 inch bed of this catalyst is charged to a reactor, reduced with $H_2$ and fed commercial cyclohexanol while maintained at a temperature of 350° C., a gaseous hourly space velocity of 1322 (or a liquid hourly space velocity of 0.7) and a dilution with 8 mols of hydrogen per mol of cyclohexanol. After three hours of operation at these conditions, the product is collected by condensing the effluent in a train of a first trap at room temperature and a second trap cooled to about −70° C. (with Dry Ice and acetone). Most of the phenol produced, together with most of the unreacted cyclohexanol is condensed in the room temperature trap and most of the benzene, water and other low-boilers are condensed in the cold trap. The weight ratio of material collected with the cold trap to the total quantity of material collected is 5.7%. In addition, solid phenol crystals are precipitated in the liquid collected in the room temperature trap, by chilling in an ice water bath.

These results indicate high cyclohexanol conversion with phenol as the principal product and moderate low boiler formation.

Similar results are obtained at a dehydrogenation reaction temperature of 340° C.

Comparable Example A.—The above procedure is repeated except that in the catalyst preparation the platinum is deposited by immersing the carbon in the boiling solution and stirring the mixture for only five minutes before filtering, washing and drying. Analysis of the catalyst indicates that over 99.9% of the platinum in solution is absorbed by the carbon in the preparation of this catalyst. After operating for seven hours with this catalyst at 340° C., the weight ratio of the material in the cold trap relative to the total material in both traps is 48%. In addition, no phenol precipitates from the room temperature trap when cooled to about 0° C.

These results indicate high conversion, with benzene and other low-boilers as the dominant products.

If the conversion is taken as 100%, the selectivity to phenol to this example is only 52% as a maximum, whereas with that of Example 1 is about 94%, clearly showing the marked improvement obtained in accordance with the invention.

Comparable results to the foregoing are obtained with various modifications thereof, including the following. The dehydrogenation step is carried out in the presence of (added) hydrogen, with the feedstock in the vapor phase. The mixture of hydrogen, cyclohexanol and cyclohexanone is contacted with dehydrogenation catalyst containing 0.5 to 5% platinum-on-carbon, in a zone maintained at a temperature in the range of from about broadly 250° to 425° C., desirably 325° to 400° C. and preferably 340° to 385° C., at a liquid hourly space velocity of broadly from about 0.3 to 2.5, desirably 0.6 to 1 and preferably 0.7 to 0.8. The weight ratio of hydrogen is in the range of 0.02 to 0.30, and desirably 0.08 to 0.16 gram of hydrogen per gram of feedstock containing approximately 80 to 100% cyclohexanol and/or cyclohexanone (or 1 to 15 mols of hydrogen per mol of the latter (total)).

The dehydrogenation pressure utilized is broadly atmospheric to 100 p.s.i.g. and preferably atmospheric. The conversion of cyclohexanone and cyclohexanol to phenol is maintained in the range of from about broadly 50 to 100% and preferably at least 75% per pass. After separation of phenol the residue may be recycled to the dehydrogenation step.

The invention involves allowing for a soak period in excess of that required for the activated carbon support to absorb virtually all the platinum from the boiling (under reflux) platinum containing solution. The excess soak time permits the platinum to be deposited on the activated carbon surface in a more efficient manner as compared with the minimum soak period (5 min.) required to completely absorb the platinum from the boiling solution. The added efficiency is evidenced by an increase in the phenol selectivity at the expense of less desirable products such as benzene.

The soak time is desirably at least about twice that required for complete absorption of the platinum, i.e., at least 10 minutes. Preferably it should be several times longer.

Similar results are obtained with the improved catalyst if used to prepare cresols from methyl-cyclohexanols and methylcyclohexanones. Also analogous lower alkyl ring substituted derivatives of cyclohexanol and cyclohexanones, where the alkyl may contain up to 5 carbon atoms.

In view of the foregoing disclosures, variations and modifications thereof will be apparent to one skilled in the art, and it is intended to include within the invention all such variations and modifications except as do not come within the scope of the appended claim.

We claim:

In a process for preparing a phenol from a crude oxygenated cyclohexane fraction containing at least one member of the group consisting of cyclohexanone and cyclohexanol and lower alkyl ring substituted derivatives thereof by vaporizing said fraction and diluting with hydrogen in an amount in the range of 0.02 to 0.30 gram of hydrogen per gram of total cyclohexanone and cyclohexanol therein and contacting the resulting mixture with a dehydrogenation catalyst at a temperature in the range of 250° to 425° C. at a liquid hourly space velocity in the range of 0.3 to 2.5 and recovering the phenol from the reaction product, the improvement which comprises using a platinum-on-active-carbon catalyst prepared by: refluxing active carbon with hydrochloric acid; water washing said refluxed active carbon free of acid; forming a solution by dissolving from 0.5 to 5 parts by weight of platinum as a platinum compound in water; admixing 100 parts of said water-washed active carbon with said solution; refluxing said admixture for about 16 hours, thereby absorbing said platinum on said active carbon to form a catalyst; separating said catalyst from the residual solution; and drying said catalyst.

References Cited

UNITED STATES PATENTS

| | | | |
|---|---|---|---|
| 2,285,277 | 6/1942 | Henke et al. | 252—447 |
| 2,503,641 | 4/1950 | Taylor et al. | 260—621 |
| 2,840,609 | 6/1958 | Sauer | 260—537 |
| 2,881,131 | 4/1959 | Kearby | 252—447 XR |
| 3,073,865 | 1/1963 | Spiegler | 252—447 XR |

LEON ZITVER, *Primary Examiner.*

HAROLD G. MOORE, *Examiner.*

D. HELFER, H. ROBERTS, *Assistant Examiners.*